United States Patent
Vezzani

(10) Patent No.: US 10,709,168 B2
(45) Date of Patent: Jul. 14, 2020

(54) HOPPER FOR ROD SHAPED ARTICLES AND METHOD FOR DISTRIBUTING ROD SHAPED ARTICLES

(71) Applicant: PHILIP MORRIS PRODUCTS S.A., Neuchatel (CH)

(72) Inventor: Marcello Vezzani, Anzola dell'Emilia (IT)

(73) Assignee: Philip Morris Products S.A., Neuchatel (CH)

(*) Notice: Subject to any disclaimer, the term of this patent is extended or adjusted under 35 U.S.C. 154(b) by 0 days.

(21) Appl. No.: 16/470,628

(22) PCT Filed: Dec. 28, 2017

(86) PCT No.: PCT/EP2017/084700
§ 371 (c)(1),
(2) Date: Jun. 18, 2019

(87) PCT Pub. No.: WO2018/122298
PCT Pub. Date: Jul. 5, 2018

(65) Prior Publication Data
US 2019/0373944 A1    Dec. 12, 2019

(30) Foreign Application Priority Data
Dec. 29, 2016   (EP) .................................. 16207399

(51) Int. Cl.
*A24C 5/32*    (2006.01)
*A24C 5/35*    (2006.01)
(Continued)

(52) U.S. Cl.
CPC .............. *A24C 5/325* (2013.01); *A24C 5/35* (2013.01); *B65G 11/203* (2013.01); *B65B 19/04* (2013.01);
(Continued)

(58) Field of Classification Search
CPC ...... A24C 5/35; A24C 5/325; B65G 47/1407; B65G 47/44; B65G 2201/0226;
(Continued)

(56) References Cited

U.S. PATENT DOCUMENTS 3,976,085 A * 8/1976 Hall .......................... A24C 5/35
                                                              131/283
4,167,091 A * 9/1979 Ruppert .................. B65B 19/04
                                                              198/418.1
(Continued)

FOREIGN PATENT DOCUMENTS

| DE | 69205797 | 5/1996 | |
|----|----------|--------|---|
| EP | 0545724 | 6/1993 | |
| EP | 2676884 | 12/2013 | |
| GB | 1137826 A | * 12/1968 | ............. B65B 19/04 |

OTHER PUBLICATIONS

PCT Search Report and Written Opinion for PCT/EP2017/084700 dated Mar. 26, 2018 (13 pages).

*Primary Examiner* — Mark A Deuble
(74) *Attorney, Agent, or Firm* — Mueting Raasch Group

(57) ABSTRACT

The invention relates to a hopper (10) for rod shaped articles (100) defining a longitudinal axis, the hopper (10) including: a chamber (20) to hold the rod shaped articles (100); a distributor device (30) to align the rod shaped articles (100) with substantially parallel longitudinal axes, the distributor device (30) including a plurality of walls (50) defining adjacent channels (40), at least one of said walls (50) including a stationary part (51) and a movable part (52) connected to the stationary part (51); and a vibrating device (70) adapted to oscillate the movable part (52) with respect to the stationary part (51).

13 Claims, 2 Drawing Sheets

(51) Int. Cl.
*B65G 11/20* (2006.01)
*B65B 19/04* (2006.01)
*B65G 47/14* (2006.01)
*B65G 47/44* (2006.01)

(52) U.S. Cl.
CPC ........ *B65G 47/145* (2013.01); *B65G 47/1407* (2013.01); *B65G 47/44* (2013.01); *B65G 2201/0226* (2013.01)

(58) Field of Classification Search
CPC ..... B65G 11/20; B65G 11/203; B65G 11/206; B65G 2201/0217; B65G 47/145; B65B 19/04
USPC .............................................. 198/533; 193/29
See application file for complete search history.

(56) References Cited

U.S. PATENT DOCUMENTS

| | | | | |
|---|---|---|---|---|
| 4,420,073 | A | * | 12/1983 | Hausler .................. A24C 5/325 198/347.2 |
| 5,201,162 | A | * | 4/1993 | Focke ..................... B65B 19/04 131/283 |
| 5,464,027 | A | * | 11/1995 | Bina ....................... A24C 5/325 131/282 |
| 6,267,223 | B1 | * | 7/2001 | Nakagawa .......... B65G 47/1407 198/396 |
| 6,540,061 | B1 | * | 4/2003 | Focke ..................... A24C 5/35 198/359 |
| 9,540,126 | B2 | * | 1/2017 | Virsila .................... B65B 19/10 |
| 2009/0025737 | A1 | * | 1/2009 | Leifheit ................... A24C 5/35 131/283 |

* cited by examiner

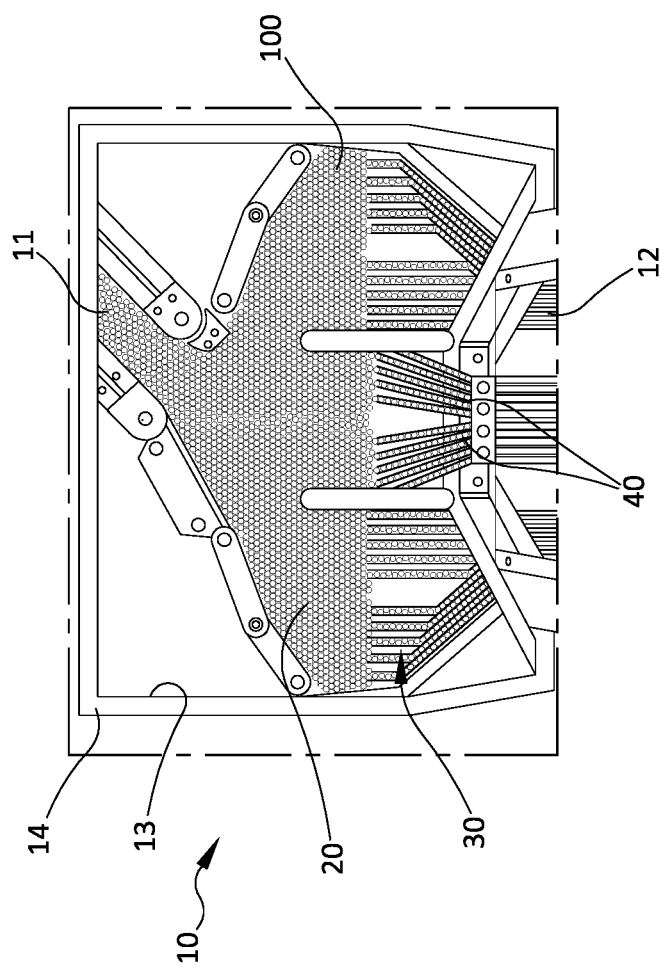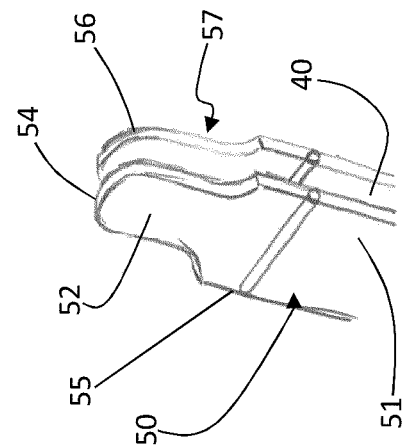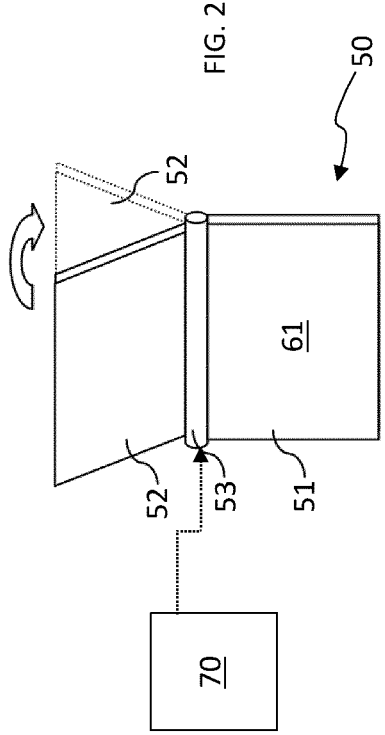

HOPPER FOR ROD SHAPED ARTICLES AND METHOD FOR DISTRIBUTING ROD SHAPED ARTICLES

This application is a U.S. National Stage Application of International Application No. PCT/EP2017/084700 filed Dec. 28, 2017, which was published in English on Jul. 5, 2018, as International Publication No. WO 2018/122298 A1. International Application No. PCT/EP2017/084700 claims priority to European Application No. 16207399.3 filed Dec. 29, 2016.

The present invention relates to a hopper for rod shaped articles and to a method for distributing rod shaped articles.

In the manufacturing of cigarette and smoking articles which include stick-shaped components, the sticks are transported from one part of the production zone to other parts and go through hoppers which are assisted by mechanical agitation of the sticks to help the mass flow of sticks to be dispatched. In order to transport the components, often there is the need to have them aligned along their longitudinal axis. That is to say, in order to properly and efficiently transport the components from one device to the other in the production, the orientation of the component is preferably not random, but they are aligned along a longitudinal axis. Components that are not aligned, are preferably rejected so that they do not jam the device in which they are processed.

Indeed, during the transportation of the components, all components have preferably the same orientation, and the existing hoppers in production lines of the known art are designed to handle such orientation. However, during the transportation of the components to the hopper, some components could have their orientation changed comparing to the orientation of the mass flow of other components, and arrive in a wrong position at the hopper. A reason for this deviation from the given orientation may be that the components are unbalanced, for example because they might be heavier in one of their ends.

In the known production lines, there are hoppers in which the mechanical agitation is provided by vibrating pins, which increase the fluidity of the flow of components into channels. However, the vibration of the pins is often not enough to properly guide the components within the channels.

It is therefore desired to have a hopper for rod shaped article and a method for distributing rod shaped articles which take into account the possibility of misalignment of the rod shaped articles and minimize the production interruption due to these misalignments.

U.S. Pat. No. 5,464,027 discloses a hopper for elongate elements, in which an exit of the hopper is defined by a plurality of substantially vertical side-by-side channels; each channel is defined by two substantially vertical baffles, and is associated with an agitator element of pendulum type having a substantially triangular cross-sectional shape and positioned above a respective baffle to oscillate, in synchronism with the other agitator elements, about a respective substantially horizontal axis.

According to a first aspect, the invention relates to a hopper for rod shaped articles defining a longitudinal axis, the hopper including: a chamber to hold the rod shaped articles; a distributor device to align the rod shaped articles with substantially parallel longitudinal axes, the distributor device including a plurality of walls defining adjacent channels, at least one of said walls including a stationary part and a movable part connected to the stationary part; and a vibrating device adapted to oscillate the movable part with respect to the stationary part.

In the hopper of the invention, walls define channels where the rod shaped articles can travel. Preferably, the width of the channel is such that the rod shaped articles can enter into the channels only along a given direction. This direction is preferably the direction perpendicular to the longitudinal axis of the rod shaped article. Therefore, only rod shaped articles aligned along such a direction can travel within the channels. Due to the vibrating movements of the movable part with respect to the stationary part, the rod shaped articles are substantially pushed to align with the direction in which they can travel within the channels because the vibration causes the rod shaped articles to rearrange their orientation. Therefore, also rod shaped articles which are wrongly oriented can be realigned so that they can enter into the channels, avoiding or minimizing production interruptions due to hopper's blockages.

Preferably, the rod shaped article is a component of an aerosol-forming article.

In the following with "rod" a substantially rod shaped element is indicated, however its cross section does not need to be circular, any cross section is possible.

Further, the rod shaped article defines a longitudinal axis, meaning that one of its dimension is longer than the other two. The longitudinal axis is the axis along the longer dimension. Preferably, cross sections taken perpendicularly to the longitudinal axis are substantially identical in area, however different configurations can be present as well.

In the following, with the term "components" any element which may be included in an aerosol-forming article is meant. Such elements are known in the art and not further detailed below. For example, such component might include a plug of a filter, a heat source, a menthol capsule, a charcoal element, and so on.

As used herein, aerosol-forming article is any article that generates an inhalable aerosol when an aerosol-forming substrate is heated. The term includes articles that comprise an aerosol-forming substrate that is heated by and external heat source, such as an electric heating element. An aerosol-forming article may be a non-combustible aerosol-forming article, which is an article that releases volatile compounds without the combustion of the aerosol-forming substrate. An aerosol-forming article may be a heated aerosol-forming article, which is an aerosol-forming article comprising an aerosol-forming substrate that is intended to be heated rather than combusted in order to release volatile compounds that can form an aerosol. The term includes articles that comprise an aerosol forming substrate and an integral heat source, for example a combustible heat source.

An aerosol-forming article may be a smoking article that generates an aerosol that is directly inhalable into a user's lungs through the user's mouth. An aerosol-forming article may resemble a conventional smoking article, such as a cigarette and may comprise tobacco. An aerosol-forming article may be disposable. An aerosol-forming article may alternatively be partially-reusable and comprise a replenishable or replaceable aerosol-forming substrate.

In preferred embodiments, the aerosol-forming article may be substantially cylindrical in shape. The aerosol-forming article may be substantially elongate. The aerosol-forming article may have a length and a circumference substantially perpendicular to the length. The aerosol-forming article may have a total length between approximately about 30 millimeters and approximately about 100 millimeters. The aerosol-forming article may have an external diameter between approximately about 5 millimeters and approximately about 12 millimeters.

In order to transport the rod shaped article from one site to the other in a production facility, hoppers are used. In the hopper, a chamber is present, where a plurality of rod shaped articles is inserted according to any known means. The rod shaped articles after insertion are housed in a chamber for further displacement. The chamber can have any known shape and dimension, preferably it is wide enough to host a given amount of rod shaped articles to keep up with the production speed.

Preferably, the width of the chamber is substantially equal to the length of the rod shaped article along their longitudinal axis. Preferably, therefore, the chamber has a first and a second peripheral wall one facing the other at a distance substantially equal or slightly longer than the length of the rod shaped articles (the length of the articles is their dimension along their longitudinal axis). Preferably, the rod shaped articles introduced in the chamber have their longitudinal axes one parallel to the others. In this way, the chamber can house only a single rod shaped article along their width, no two articles in series can be present. The articles are thus positioned either side by side with their axes parallel to each other, or one above the others. However, some of the rod shaped articles can be aligned differently, that is, can have a longitudinal axis not directed perpendicularly to the peripheral walls, but having an angle smaller than 90° with any of the two walls.

The chamber communicates with a plurality of channels. These channels are part of a distributor device adapted to align the rod shaped articles, also the ones having an orientation different than the orientation of the majority of the articles, for example, the channels may realign those rod shaped articles the longitudinal axis of which is not perpendicular to the peripheral walls of the hopper. The distributor device includes a plurality of channels which are defined by a plurality of walls. Each channel is defined by two facing walls and defines an inlet where the rod shaped articles enter and an outlet from where the rod shaped article exit. The walls of the channels are preferably positioned perpendicularly to the peripheral walls of the chamber, so that the channels are also substantially perpendicular to the chamber's peripheral walls. Preferably, the distance between two walls is such that the rod shaped article can enter into the channel. Preferably, the distance between the walls of the channels is equal or slightly larger than the biggest dimension of the rod shaped article in a cross section taken perpendicularly to the longitudinal axis. The rod shaped articles which enter into the channels then travel in a direction perpendicular to their longitudinal axis. Preferably, the longitudinal axis of the rod shaped article is parallel to a surface of the wall defining the channel.

Preferably, the peripheral walls of the chamber are in contact to the ends of the channels to close the same The channels in a direction perpendicular to the channel's wall define a first and a second end, which are closed by the peripheral walls of the chamber. Each channel is thus a conduit, having walls closing all its sides with the exception of the inlet which opens in the chamber and the outlet positioned at the opposite end of the channel in the direction of flow of the rod shaped articles.

The width of the channels, defined as the width of the walls, is for example equal to the distance between the peripheral walls of the chamber, and it is preferably identical to the width of the chamber, more preferably equal or slightly longer than the length of the rod shaped articles.

Preferably, the channels are substantially vertical, that is, preferably the walls defining the channels are positioned vertically, so that the rod shaped articles can enter into the channels due to gravity and exit the same also due to gravity. Preferably, the chamber is located above the channels, so that the walls defining the channels extend from the bottom of the chamber in a vertical direction downwards.

The channels may also be slightly tilted with respect to the vertical direction.

Preferably, at the end of the channels, an exit of the hopper is present, so that the aligned rod shaped articles can exit the hopper.

The rod shaped articles inserted in the hopper thus preferably slide towards the channels and enter the same with their longitudinal axes substantially parallel to the walls defining the channels, more preferably with their opposite ends facing the peripheral walls of the chamber. They then fall through the channels perpendicularly to their longitudinal axis or in a direction which is slightly tilted with respect to the vertical one.

At least one wall of the channels, and preferably at least the majority of the walls, even more preferably all of the walls, include a stationary part and a movable part. The two parts are connected to each other and preferably are one the geometrical extension of the other. The wall is thus divided preferably into a stationary part which includes one end of the wall at the outlet of the channel and into a movable part which includes the opposite end of the wall at the inlet of the channel. Preferably, the movable part faces the chamber, so that the rod shaped articles, when inserted, are first directed towards the movable part of the wall.

The movable part performs movements, and preferably vibration movements, back and forth, due to a vibrating device which moves the movable part. Preferably, the vibrations are around a plane defined by the stationary part. The plane has an upper end and the upper end defines the axis of rotation of the movable part. Therefore, the movable part may rotate around the axis of rotation which belongs to the plane defined by the stationary part. The movement may be symmetric around such a plane. The "zero" of the rotation is defined when the movable part and the stationary part both lie on the same plane. When the movable part starts rotating around the axis of rotation, it may oscillate of the same angle on one side or on the other of the plane, so that the oscillations or vibrations are symmetric with respect to the plane.

Preferably, the movable part is positioned at the inlet of the channels, while the stationary part includes the outlet of the channels.

Preferably, the connection between the stationary part and the movable part is located at a given distance from an end of the wall, this distance being different from zero. The size of the movable part is not negligible in order to obtain a proper "sweeping" action on the misaligned rod shaped articles.

Thus, the movable part sweeps the rod shaped articles, for example the rod shaped articles positioned above it, reorienting the same. By the movements, the rod shaped articles are invited to flow within the channels in an aligned manner. Rod shaped articles coming into contact with the movable part in a not correctly aligned position, that is, with their longitudinal axes not parallel to the walls of the channels, can eventually re-orient due to the oscillating movement of the movable part.

Blockage of the flow of the rod shaped articles in the channels of the hopper is therefore minimized.

The rod shaped articles can therefore flow in the channels and exit the hopper, so that further processing of the same is possible.

Preferably, several walls of the plurality include a stationary part and a movable part connected to the stationary part. A movement of a plurality of the walls is preferred so as to span the whole dimension of the hopper, so that most of the rod shaped articles can experience the sweeping motion which is helpful for the re-alignment.

Preferably, said vibrating device is adapted to oscillate the movable parts synchronously. A joint motion, that is, a synchronous motion of all movable parts of the walls of the channel is preferred to avoid jamming of the channels.

Preferably, the stationary part is hinged to the movable part. More preferably, a motorized joint is used. An end of the stationary part is preferably provided with a joint connecting it with an end of the movable part.

Preferably, the channels are substantially parallel one to the other. In this way, all channels impart the same orientation to the rod shaped articles.

Preferably, some channels are slightly tilted with respect to each other. For example, the inlet of the channel is wider than the outlet of the channel, so that the two walls forming the channel are slightly converging.

Preferably, said stationary part is substantially vertical. The walls are preferably substantially vertical so that the rod shaped articles are falling within the channels due to gravity.

Preferably, the movable part is adapted to span an angle of about 1° to about 30° in its movement. The total angle of span, from a first to a second end position of the movement of the movable part with respect to the stationary part, is preferably comprised between about 1° and about 30°, more preferably between about 5° and about 15°. In case of a symmetric movement, the angle can be measured with respect to a plane defined by the stationary part (when the stationary part and the movable part lie on the same plane, this is considered to be the "zero"), and the maximum angle formed between such a plane and the movable part (or a plane passing through the movable part) is preferably comprised between about 0.5° and about 15°, more preferably between about 2.5° and about 7.5°. This angle is considered to be preferred to reorient the rod shaped articles and at the same time to allow a constant flow of rod shaped articles into the channels. Larger angles would cause the closure of the channels for a certain time during the movement, smaller angles would not create the sweeping effect.

Preferably, the vibrating device is adapted to oscillate the movable part at a frequency of about 1 cycle per second to about 25 cycles per second. More preferably, the frequency of oscillation is comprised between about 5 cycles per second to about 10 cycles per second.

Preferably, a breadth of the channel is defined by the distance between two adjacent walls, and a width of the channel is defined as a width of a wall delimiting it, for example equal to the distance between the peripheral walls of the chamber, and wherein the breadth is smaller than the width so that the rod shaped articles travels into the channels in a direction substantially perpendicular to their longitudinal axes. Preferably, the breadth of the channel is shorter than the length of the rod shaped article. Preferably, the channels "force" the rod shape articles to flow in a direction substantially perpendicular to the longitudinal axes of the rod shaped articles themselves. Preferably, the longitudinal axes are parallel to the channels' walls.

Preferably, the movable part defines a first end connected to the stationary part and an opposite free end extending into the chamber. The movable part is thus preferably substantially extending into the chamber and it is in contact with rod shaped articles entering the channels.

Preferably, the movable part defines a first and a second opposite surfaces, at least one of which facing a channel, and a connecting border surface, connecting the first and the second surface and substantially perpendicular to the first and second surface, the connecting border surface facing said chamber and including an inclined portion forming a slope leading away from said chamber. The movable part thus has two "major" surfaces which are part of two adjacent channels. Preferably, one "major" surface of the movable part belongs to one channel and the other belongs to an adjacent channel. These two surfaces are connected by a third surface, preferably "smaller" and called connecting border surface, which is facing the chamber. The border surface substantially extends through the thickness of the movable part, between the two major surfaces. This connecting border surface is mainly in contact with the rod shaped articles present in the chamber. This surface is preferably not parallel nor perpendicular to the direction of flow of the rod shaped articles within the channels, preferably it is perpendicular to the two "major" surfaces of the movable part, and it defines a slope. The slope is substantially part of an inclined portion of the movable part. Preferably, perpendicularly to the channels, a slope is formed to direct rod shaped articles the axis of which is "too tilted" with respect to the desired direction. Indeed, when the rod shaped articles move towards the channels, the longitudinal axis of some of them may form an angle with respect to the desired direction of flow which is not re-orientable by means of the oscillations of the movable parts. These rod shaped articles may block the hopper, because they hinder the correct flow of rod shaped articles in the channels, positioning themselves on top of the movable parts. The slope formed in the movable parts allows redirecting the non-correctly oriented rod shaped articles away from the walls of the channels, because they are substantially forced to roll down the slope formed in the movable part. Preferably, the movable part, in order to form the slope, has a variable cross section, more preferably, the movable parts have a constant thickness, but a variable width. Cross sections of the movable part taken perpendicularly to the direction of flow of the rod shaped articles in the channels at the connection with the stationary part have the widest area, while this area reduces in the cross sections taken moving closer to the chamber (closer to the free end of the movable part).

More preferably, the hopper includes a rejection chamber, said rejection chamber being in communication with said slope to collect misplaced rod shaped articles rolling down said slope. This rejection chamber is located preferably at the end of the slope so as to collect the rejected rod shaped articles.

Preferably, the movable part defines a first and a second parallel surfaces, at least one of which facing a channel, and a connecting border surface, connecting the first and the second surface and substantially perpendicular to the first and second surface, the connecting border surface facing said chamber and forming a chamfer. The movable surface has preferably a "roundish shape" to help the rod shaped articles to roll through the slope and fall into the rejection chamber.

Preferably, said movable part has a width which increases from a free end facing the chamber to an end connected to the stationary part. This shape forms the "slope" to convey misplaced rod shaped articles to the rejection chamber.

Preferably, said plurality of channels channels the rod shaped articles with their longitudinal axes aligned along a first direction of travel, and several of the walls of the plurality include a movable part, the movable parts having a width which increases from a free end facing the chamber to an end connected to the stationary part, so that they form an auxiliary channel channeling misplaced rod shaped articles with their longitudinal axes aligned along a second direction of travel. Different movable parts, all including the "slope" onto which rod shaped articles may roll, form an additional channel, made for example by the plurality of the border surfaces, which leads the misplaced rod shaped articles away from the channels formed by the walls. There are two directions of alignment defined: a first direction of alignment of longitudinal axis of the rod shaped articles, which is the desired one, and a second direction of alignment of the rejected rod shaped articles away from the chamber, the second direction being the direction of alignment of the longitudinal axes of the rejected articles. Preferably the first direction of alignment is substantially perpendicular to the first direction of flow or travel of the "correctly aligned" rod shaped articles, while the second direction of alignment is substantially perpendicular to the second direction of flow or travel of the not-correctly aligned rod-shaped articles. The two directions of alignment are not parallel to each other. Preferably the first and the second direction of flow or travel are not coincident. Preferably, the second direction of flow or travel extends vertically downwards and outwards from the chamber. Preferably the first direction and the second direction of alignment are askew. Preferably, the second direction of alignment diverges from first direction of alignment at an acute angle. Preferably, the second direction of alignment is substantially perpendicular to the first direction of alignment. Preferably, both the first and the second direction of alignment are substantially horizontal. Preferably, both the first and the second direction of flow or travel have a vertical component. Preferably also the first and second direction of flow or travel are not parallel. Preferably, the stationary part is plate like shaped. More preferably, the plate is substantially vertical.

Preferably, the movable member is plate-like shaped.

According to a second aspect, the invention relates to a method to distribute a plurality of rod shaped articles in a plurality of channels, said method including: placing a plurality of rod shaped articles in a chamber; distributing the plurality of rod shaped article within a plurality of channels, wherein the channels are defined by a plurality of adjacent walls, at least one of said walls including a stationary part and a movable part connected to the stationary part; wherein the step of distributing includes: vibrating the movable part with respect to the stationary part so as to push the rod shaped articles within the channels.

Advantages of the second aspect have been already outlined with respect to the first aspect and are not repeated herein.

Preferably, the method comprises the steps of providing the movable part with a first and a second opposite surfaces, at least one of which facing a channel, and a connecting border surface, connecting the first and the second surface and substantially perpendicular to the first and second surface, the connecting border surface facing said chamber and including an inclined portion forming a slope leading away from said chamber; and rejecting rod shaped articles rolling down the slope.

Preferably, the method comprises vibrating the movable part with respect to the stationary part at a frequency of about 1 cycle per second to about 25 cycles per second.

The invention will be further described, by way of example only, with reference to the accompanying drawings in which:

FIG. 1 is a perspective view of a hopper realized according to the present invention;

FIG. 2 is a schematic perspective view of a first embodiment of a detail of the hopper of FIG. 1;

FIG. 3 is a schematic perspective view of a second embodiment of a detail of the hopper of FIG. 1.

Figure 4:
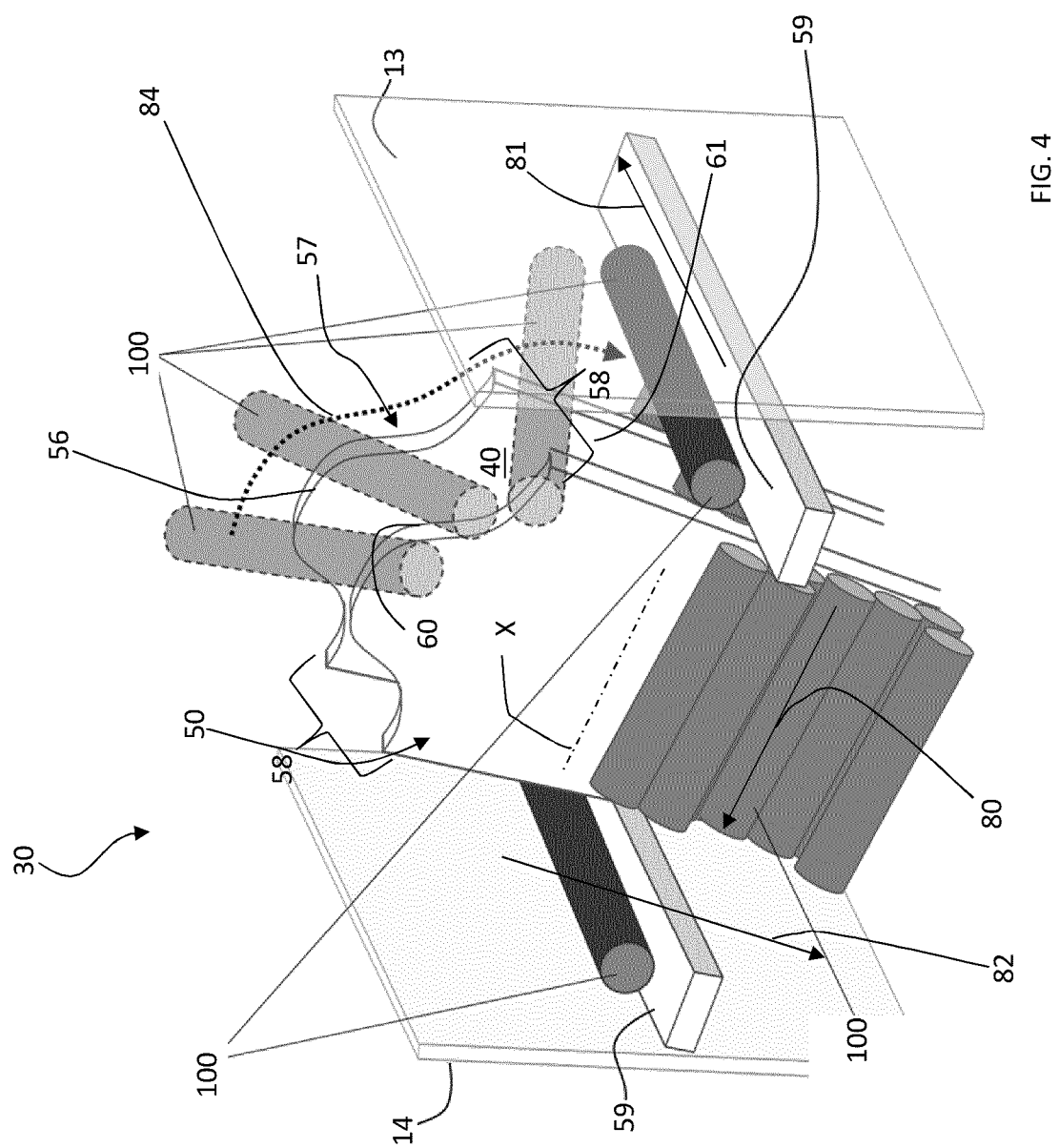
FIG. 4 is a schematic perspective view of the detail of the hopper of FIG. 3 in function according to the method of the invention.

With reference to FIG. 1, a hopper to align rod shaped articles is generally referred as 10. The rod shaped articles are for example components of an aerosol forming articles, such as filter components, and are all designated with 100.

The filter components 100 have a cylindrical shape and define a longitudinal axis X. The filter components 100 have a given length. Preferably their length is the same among all filter components.

Hopper 10 includes a chamber 20 having an inlet 11 to introduce the filter components. The hopper 10 further includes an outlet 12, located in its bottom part. Further, the hopper 10 includes a distributor device 30, located below the chamber 20, and connecting the chamber 20 with the outlet 12. The chamber 20 is delimited by two parallel peripheral walls 13, 14, preferably made of transparent material, such as Plexiglas, the distance between which defines the width of the chamber 20. Preferably, the width of the chamber 20 is equal to or slightly longer than the length of the filter components 100.

The distributor device 30 includes a plurality of channels 40, formed by a plurality of walls 50 (see FIG. 3). Some of the walls may be parallel to each other, some others are slightly converging from the chamber 20 towards the outlet 12. The walls 50 are substantially vertical or slightly tilted with respect to the vertical axis. The walls 50 thus define substantially parallel planes. Two walls form a channel 40, by two opposite facing surfaces 60, 61 preferably planar (visible only in FIG. 4). The distance between two walls, defining the breadth of the channel, is preferably equal to the largest dimension in cross section of the filter component 100 in a direction perpendicular to the longitudinal axis X. The distributor device is closed in the direction perpendicular to the walls 50 by the peripheral walls 13, 14 of the chamber 20 which extend downwards to cover the whole distributor device 30.

Each channel 40 is better detailed in FIG. 2-4.

In a first embodiment of FIG. 2, the wall 50, which has substantially a plate—like form, includes a stationary part 51 extending from the bottom of the hopper 10 and a movable part 52 hinged to the stationary part 51 by a motorized hinge 53. The movable part 52 is put into oscillation by a vibrating device 70. The speed of motion and the angle formed between the movable part and the stationary part can be tuned.

The movable part 52 of each wall 50 extends into the chamber 20, while the stationary part 52 extends from the outlet 12 of the hopper 10 upwards.

A second embodiment of the channels 40 is depicted in FIG. 3, where only the differences between this embodiment and the embodiment in FIG. 2 will be described.

In the second embodiment of the channels 40, depicted in FIG. 3, the movable part 52 has a tapered shape, its width increasing from a first end 54 having the smallest size and facing the chamber 20 to a second end 55 hinged to the stationary part and having the biggest size. The tapered shape forms a boundary surface 56 having a slope 57. As better shown in FIG. 4, a plurality of boundary surfaces 56 or slopes 57 defines a rejection channel 58 to roll rejected components 100 from the channels 40. The rejection channel 58 terminates into a rejection chamber 59.

In operation, the alignment of the rod shaped articles 100 is as follows.

Rod shaped articles 100 are introduced in the chamber 20 of the hopper 10 with substantially aligned longitudinal axes X so that the peripheral walls 13, 14 of the chamber 20 face the two opposite ends of most of the rod shaped articles 100. Some of the components 100 however may not have this orientation or can become misaligned while flowing in the hopper.

The various rod shaped articles 100 are directed by gravity towards the channels 40 positioned at the bottom of the chamber 20. The rod shaped articles flowing downwards enter into contact with the movable parts 52 of walls 50 which oscillate at a given frequency and, in case they are slightly misaligned, their alignment is corrected and they can flow in the channels 40 in a first direction of flow 82, with their longitudinal axes X (parallel to the first direction of alignment) substantially perpendicular to the first direction of flow 82. The first direction of alignment of the longitudinal axes is indicated with arrow 80 in FIG. 4 and it is parallel to surfaces 60, 61 of walls 50. The rod shaped articles which have exited the channels 40 then leave the hopper 10 via the outlet 12.

Rod shaped articles 100 which are tilted greatly from the first direction of alignment 80, are separated from the main flow before jamming channels. This take place as depicted in FIG. 4. Upon contact between the misaligned rod shaped articles and the sloped boundary surface 56, the slopes 57 of the movable parts force the misaligned rod shaped articles to further rotate and align their longitudinal axes X along a second direction of alignment, as depicted with a arrow 81 in FIG. 4. The misaligned rod shaped articles then moves towards a rejection chamber 59 in a second direction of flow 84 (depicted with a dotted arrow in FIG. 40) perpendicular to their second direction of alignment 81. The rejected rod shaped articles can be further re-introduced in the hopper.

The invention claimed is:

1. A hopper for rod shaped articles defining a longitudinal axis, the hopper including:
    a chamber to hold the rod shaped articles;
    a distributor device to align the rod shaped articles with substantially parallel longitudinal axes, the distributor device including a plurality of walls defining adjacent channels, at least one of said walls including a stationary part and a movable part hinged to the stationary part; and
    a vibrating device adapted to oscillate the movable part with respect to the stationary part.

2. Hopper according to claim 1, wherein several walls of the plurality include a stationary part and a movable part connected to the stationary part.

3. Hopper according to claim 2, wherein said vibrating device is adapted to oscillate the movable parts synchronously.

4. Hopper according to claim 1, wherein the channels are substantially parallel one to the other.

5. Hopper according to claim 1, wherein said stationary part is substantially vertical.

6. Hopper according to claim 1, wherein the movable part is adapted to span an angle of about 1° to about 30° in its movement.

7. Hopper according to claim 1, wherein the vibrating device is adapted to oscillate the movable part at a frequency of about 1 cycle per second to about 25 cycles per second.

8. Hopper according to claim 1, wherein a breadth of the channel is defined by the distance between two adjacent walls, and a width of the channel is defined as a width of a wall delimiting it, and wherein the breadth is smaller than the width so that the rod shaped articles travel into the channels in a direction substantially perpendicular to their longitudinal axes.

9. Hopper according to claim 1, wherein the movable part defines a first end connected to the stationary part and an opposite free end extending into the chamber.

10. Hopper according to claim 1, wherein said plurality of channels channels the rod shaped article along a first direction of travel and several of the walls of the plurality include a movable part, the movable parts having a width which increases from a free end facing the chamber to an end connected to the stationary part, so that they form an auxiliary channel channelling misplaced rod shaped articles along a second direction of travel.

11. A method to distribute a plurality of rod shaped articles in a plurality of channels, said method including:
    placing a plurality of rod shaped articles in a chamber;
    distributing the plurality of rod shaped article within a plurality of channels, wherein the channels are defined by a plurality of adjacent walls, at least one of said walls including a stationary part and a movable part hinged to the stationary part; wherein the step of distributing includes:
        vibrating the movable part with respect to the stationary part so as to push the rod shaped articles within the channels.

12. The method according to claim 11, including the steps of:
    providing the movable part with a first and a second opposite surfaces, at least one of which faces a channel, and a connecting border surface, connecting the first and the second surface and substantially perpendicular to the first and second surface, the connecting border surface facing said chamber and including an inclined portion forming a slope leading away from said chamber; and
    rejecting rod shaped articles rolling down the slope.

13. The method according to claim 11, comprising:
    vibrating the movable part with respect to the stationary part at a frequency of about 1 cycle per second to about 25 cycles per second.

* * * * *